United States Patent [19]

Miki et al.

[11] Patent Number: 4,462,277

[45] Date of Patent: Jul. 31, 1984

[54] HYDRAULIC REGULATOR FOR A V-BELT TYPE CONTINUOUSLY VARIABLE TRANSMISSION FOR VEHICLES

[76] Inventors: Nobuaki Miki, No. 3-47, Okino, Noda-cho, Kariya, Aichi Prefecture, Japan; Shoji Yokoyama, No. 1, Nakata, Kawashima-cho, Anjo, Aichi Prefecture, Japan

[21] Appl. No.: 256,075

[22] Filed: Apr. 21, 1981

[30] Foreign Application Priority Data

Apr. 30, 1980 [JP] Japan ................................. 55-58217

[51] Int. Cl.³ ....................... B60K 41/12; B60K 41/16
[52] U.S. Cl. ........................................ 74/867; 74/864; 74/862; 74/870
[58] Field of Search ................. 74/861, 862, 864, 865, 74/867, 868, 870; 474/18, 28

[56] References Cited

U.S. PATENT DOCUMENTS

| | | | |
|---|---|---|---|
| 3,044,316 | 7/1962 | Forster | 74/868 |
| 3,596,528 | 8/1971 | Dittrich | 74/865 |
| 3,600,961 | 8/1971 | Rattunde | 74/867 |
| 3,893,344 | 7/1975 | Dantlgraber et al. | 74/867 |
| 4,161,894 | 7/1979 | Giacosa | 74/863 |

*Primary Examiner*—Allan D. Herrmann
*Assistant Examiner*—D. Wright
*Attorney, Agent, or Firm*—Cooper, Dunham, Clark, Griffin & Moran

[57] ABSTRACT

A hydraulic pressure regulator in a V-belt type continuously variable transmission for vehicles comprises a torque ratio pressure control valve providing torque ratio pressure corresponding to the reduction ratio between input and output shafts, a regulator valve receiving the torque ratio pressure and providing the line pressure corresponding to the torque ratio pressure, and feedback passages of output hydraulic pressure of the torque ratio pressure control valve acting on the torque ratio pressure passage through an orifice. In the hydraulic pressure regulator, the feedback hydraulic pressure is changed in intake or exhaust state and the torque ratio pressure entered to the regulator valve is varied stepwise corresponding to the throttle opening, and the line pressure is controlled stepwise corresponding to the throttle opening, thereby the line pressure can be approached to the minimum value required by the hydraulic control circuit. Thus loss of the driving force of the engine on account of the oil pump can be reduced and the rate of fuel consumption in the engine be also reduced.

5 Claims, 36 Drawing Figures

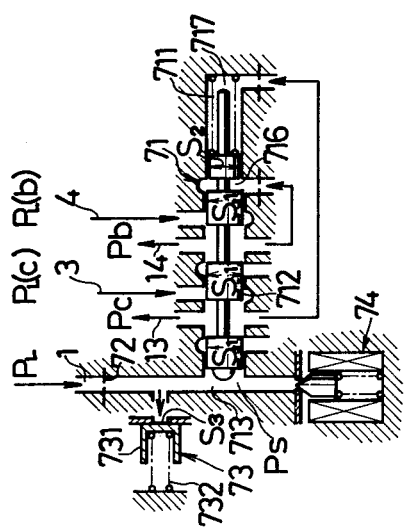
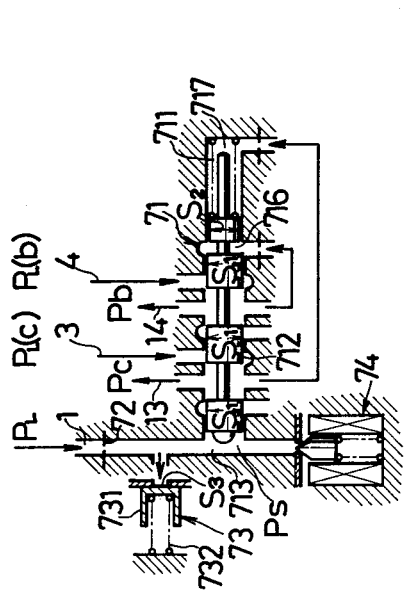

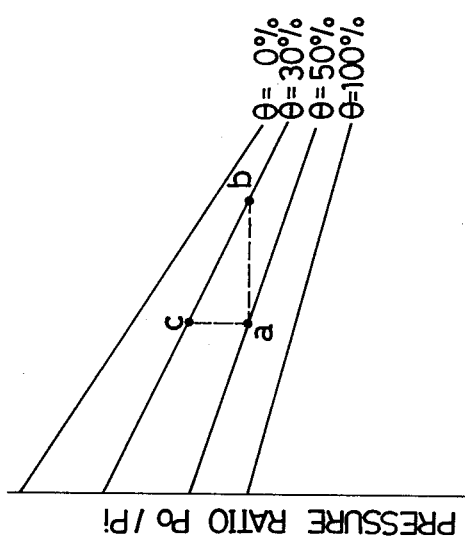
Fig.31
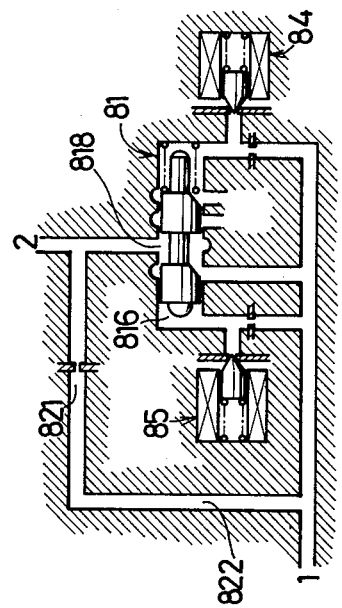
Fig.32
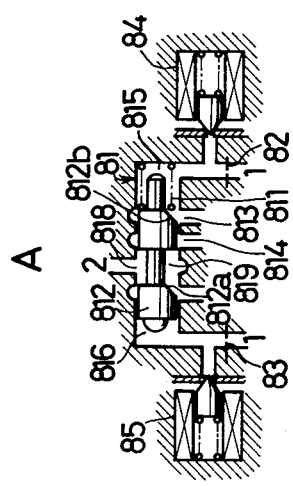
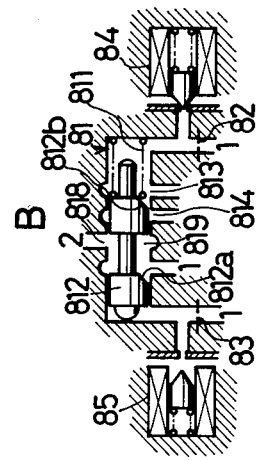
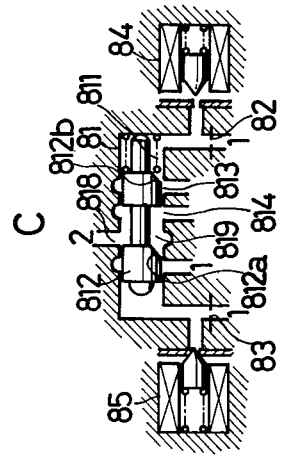
Fig.30

HYDRAULIC REGULATOR FOR A V-BELT TYPE CONTINUOUSLY VARIABLE TRANSMISSION FOR VEHICLES

BACKGROUND OF THE INVENTION

1. Field of the Invention

The present invention relates to an automatic transmission for vehicles using a V-belt type continuously variable transmission, and more particularly to a hydraulic regulator for regulating the hydraulic regulator for regulating the hydraulic pressure (line pressure) supplied to hydraulic servo system of the automatic transmission.

2. Description of the Prior Art

A V-belt type continuously variable transmission can be used in combination with a planetary gear set for changing forward and reverse drives as an automatic transmission for vehicles such as automobiles. The continuously variable transmission is controlled by an automatic control device comprising an electric control circuit receiving input signals of vehicle running conditions such as the throttle opening, the vehicle speed, the input pulley revolution speed or the shift lever setting position, and a hydraulic control circuit adjusting the reduction ratio between input and output shafts in the V-belt type continuously variable transmission and selecting the forward or reverse drive of the planetary gear set. The hydraulic control circuit is supplied with the line pressure produced by regulating with a hydraulic regulator the delivery pressure of an oil pump driven by an engine. The line pressure required by the hydraulic control circuit varies mainly depending on the reduction ratio between the input and output shafts of the V-belt type continuously variable transmission and the input torque from the engine. There is a minimum value of the line pressure needed for running without the belt slip is prescribed.

SUMMARY OF THE INVENTION

An object of the present invention is to provide a hydraulic regulator in a continuously variable transmission for vehicles wherein the line pressure is close to the minimum value needed to operate the hydraulic servo mechanism.

Another object of the present invention is to provide a hydraulic regulator wherein power loss in the pump driving force is reduced, the rate of fuel consumption in the engine is decreased, and the performance of the vehicle is improved.

Another object of the present invention is to provide a hydraulic regulator wherein the line pressure is varied stepwise to be close to the required minimum value.

Another object of the present invention is to provide a hydraulic regulator which permits a larger driving force upon vehicle starting by generating increased line pressure.

Another object of the present invention is to provide a hydraulic regulator wherein the line pressure is regulated depending on the detection of the reduction ratio between the input and output shafts of the V-belt type continuously variable transmission.

BRIEF DESCRIPTION OF THE DRAWINGS

FIG. 26 is a diagram illustrating operation of the shift control mechanism;

FIG. 27 is a graph showing characteristics of hydraulic pressure supplied to the hydraulic servo system of the input and output pulleys;

FIG. 28 is a graph showing characteristics of solenoid pressure Ps;

FIG. 29 is a graph showing characteristics of output hydraulic pressure of the shift control valve;

FIG. 30 is a diagram illustrating operation of a torque ratio control device;

FIG. 31 is a graph showing the relation between the reduction ratio T of input and output shafts in a V-belt type continuously variable transmission and the pressure ratio of the input and output hydraulic servo systems;

FIG. 32 is a diagram showing another embodiment of the shift control mechanism;

DETAILED DESCRIPTION OF THE PREFERRED EMBODIMENT

The present invention will now be described in more detail with reference to preferred embodiments thereof shown in the accompanying drawings.

Figure 1:
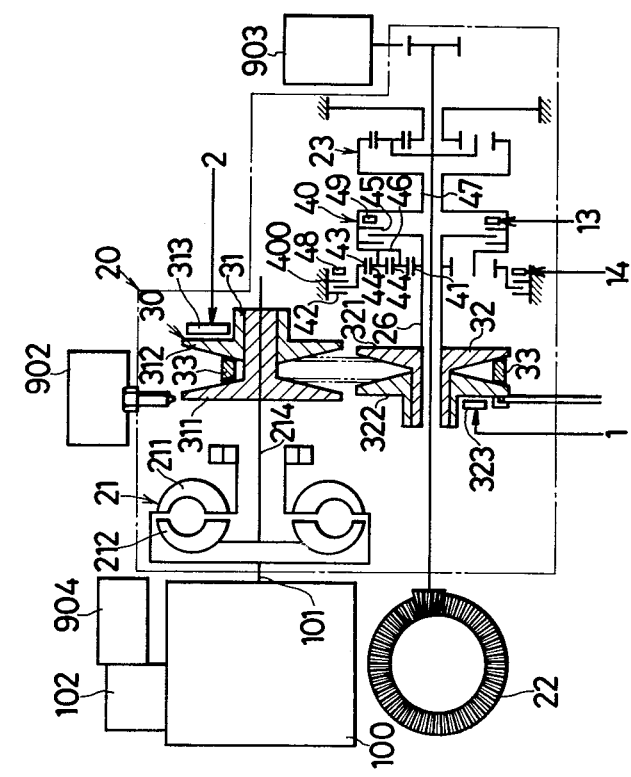
FIG. 1 is a schematic representation of a stepless transmission apparatus for vehicles using a V-belt type continuously variable transmission.

FIG. 1 is a schematic representation of a continuously variable transmission apparatus for vehicles using a V-belt type continuously variable transmission. In the figure, numeral 100 designates an engine, 102 a carburetor, and 20 a transmission disposed between the engine 100 and the driving axle. The transmission 20 comprises a fluid coupling 21 connected to an engine output shaft 101, a reduction gear mechanism 23 connected to a differential gear 22, and a continuously variable transmission unit comprising a V-belt type continuously variable transmission 30 and a planetary gear set 40 for changing forward and reverse drives.

The fluid coupling 21 is that of a known type comprising a pump impeller 211 and a turbine runner 212 connected to a fluid coupling output shaft 214. In place of the fluid coupling, other fluid type torque converter or a mechanical clutch may be used.

The V-belt type continuously variable transmission 30 is that of a known type comprising an input pulley 31 comprising a stationary flange 311 connected to the fluid coupling output shaft 214 as the input shaft of the continuously variable transmission 30, a movable flange 312 opposite to the stationary flange 311, said shafts forming a V-shaped space, and a hydraulic servo system 313 driving the movable flange 312; an output pulley 32 comprising a stationary flange 321 connected to an intermediate shaft 26 as the output shaft of the continuously variable transmission 30, a movable flange 322 opposite to the stationary flange 321, said shafts forming a V-shaped space, and a hydraulic servo system 323 driving the movable flange 322, and a V-belt 33 connecting the input pulley 31 with the output pulley 32. The amount of displacement L of the movable flanges 312 and 322 at the input and output shafts 31 and 32 determines the torque ratio between input and output shafts. L varies over the range $0-l_2-l_3-l_4$ ($0 < l_2 < l_3 < l_4$) so that the reduction ratio T between the input shaft 214 and the output shaft 26 of the continuously variable transmission 30 is continuously varied in the range of $t_1-t_2-t_3-t_4$ ($T_1 < t_2 < t_3 < t_4$). Since the pressure receiving area of the input hydraulic servo system 313 is about twice as large as that of the output hydraulic servo system 323 in this embodiment, the input movable flange 312 is subjected to a larger driving force than the output movable flange 322 even when the hydraulic pressure in the servo system 313 is less than or equal to that in the servo system 323. The enlarged pressure receiving area of the hydraulic servo system 313 may be attained by enlarging the diameter of the servo system or by using a piston having twice the receiving area in the servo system.

The planetary gear set 40 changing the forward and reverse drives comprises a sun gear 41 connected to the intermediate shaft 26 of the continuously variable transmission 30, a ring gear 43 engaged to a case 400 of the transmission unit through a multi-plate brake 42, a double planetary gear 44 rotatably meshed between the sun gear 41 and the ring gear 43, a planetary carrier 46 supporting the double planetary gear 44 rotatably connected to the intermediate shaft 26 through a multi-plate clutch 45 and to a second intermediate shaft 47 as the output shaft of the planetary gear set 40, a hydraulic servo system 48 operating the multi-plate brake 42, and a hydraulic servo system 49 operating the multi-plate clutch 45. The planetary gear set 40 changing the forward and reverse drive provides a forward gear when the multiplate clutch 45 is engaged and the multi-plate brake 42 is released, and provides a reverse gear with a reduction ratio of 1.02 when the clutch 45 is released and the brake 42 is engaged. The reduction ratio of 1.02 in the reverse drive is small in comparison to that in the usual transmission unit. In this embodiment, however, the reduction ratio obtained at the V-belt type continuously variable transmission, e.g. 2.4, and the reduction performance of the reduction gear mechanism 23, as hereinafter described, render a suitable reduction ratio.

The reduction gear mechanism 23 compensates for the low reduction ratio in the V-belt type continuously variable transmission 30 in comparison to the usual transmission unit, and provides a reduction ratio of 1.45 between input and output shafts to increase the torque.

The differential gear 22 is connected to the axle (not shown) and provides a final reduction ratio of 3.727:1.

Figure 2:
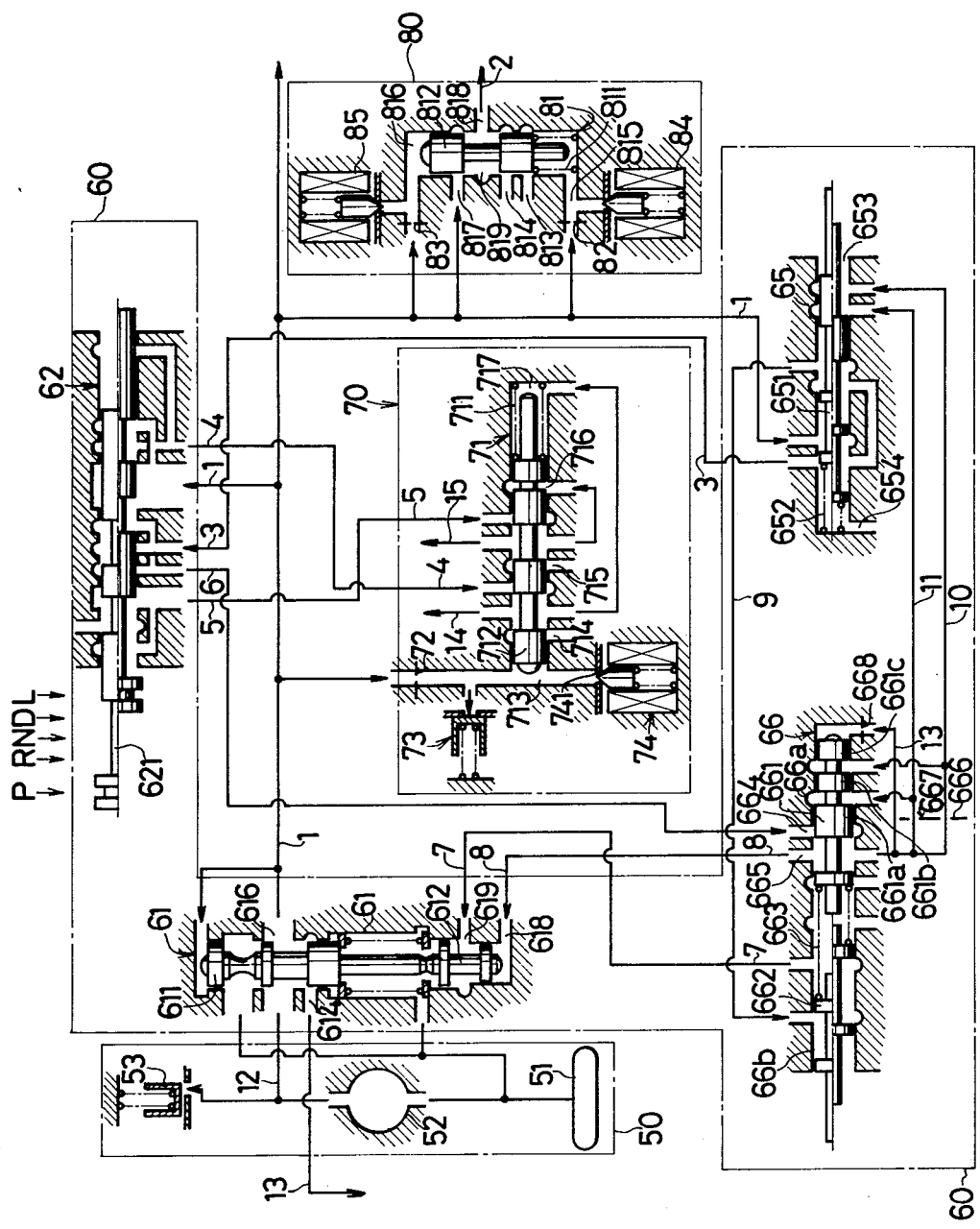
FIG. 2 is a diagram of a hydraulic control circuit of a stepless transmission apparatus including a hydraulic pressure regulator according to the present invention.

FIG. 2 shows a hydraulic control circuit which controls the continuously variable transmission unit in the transmission of FIG. 1.

The hydraulic control circuit comprises a hydraulic pressure source 50, a manual valve 62 operated manually by a shift lever (not shown), a shift control mechanism 70 controlling the timing of engagement of the multi-plate brake and multi-plate clutch in the planetary gear set 40 and retarding the shock of the N-D and N-R shift, an input pulley control device 80, and a hydraulic pressure regulator 60 according to the present invention.

The hydraulic pressure regulator 60 comprises a regulator valve 61 regulating the hydraulic pressure supplied from the hydraulic pressure source 50 and providing the line pressure to portions of the hydraulic circuit, a throttle valve 65 receiving the line pressure supplied from the regulator valve 61 and providing throttle pressure depending on the throttle opening $\theta$ of the carburetor 102, and a torque ratio pressure control valve 66 regulating the throttle pressure (line pressure through throttle valve) supplied from the throttle valve 65 corresponding to the amount of displacement L in the movable flange 322 of the output pulley 32 and providing the torque ratio pressure. The torque ratio pressure control valve 66 includes a first torque ratio pressure output mechanism 66a providing the torque ratio pressure in full range of the reduction ratio T (hereinafter referred to as "first torque ratio pressure"), a second torque ratio pressure output mechanism 66b providing the line pressure introduced through the throttle valve (hereinafter referred to as "second torque ratio pressure") when the reduction ratio T is larger than the setting value $t_3$, and both first torque feedback passages 10 and 11 to be decreased in pressure in sequence as the throttle opening increases.

The hydraulic pressure source 50 supplies hydraulic oil pumped from an oil strainer 51 to the regulator valve 61 through passage 12. The hydraulic pressure source 50 uses a pump 52 driven by the engine and has a relief valve 53.

In the manual valve 62, a spool 621 is set to positions P, R, N, D and L corresponding to the shift positions P, R, N, D and L of the shift lever manually selected by the driver. Thereby the manual valve 62 communicates the line pressure from passage 1 directly or through the throttle valve and passage 3 to passages 4–6 which distribute the line pressure in various portions of the hydraulic control circuit as shown in Table 1.

TABLE 1

|  | P | R | N | D | L |
|---|---|---|---|---|---|
| Passage 4 | X | X | X | O | O |
| Passage 5 | X | O | X | X | X |
| Passage 6 | Δ | O | Δ | Δ | O |

In Table 1, a symbol (O) designates communication of pressure from passage 1, a symbol (Δ) designates communication from passage 3, and a symbol (X) designates no communication of pressure from passages 1 and 3 to passages 4–6.

The regulator valve 61 is provided with a spool 611, and a regulator (valve) plunger 612 responsive to first and second torque ratio pressure as hereinafter described to control the spool 611. The area of the gap opening to an output port 614 varies according to the displacement of the spool 611. The line pressure is supplied from an output port 616 to the passage 1. Hydraulic oil is supplied from the output port 614 through the passage 13 to a torque converter, an oil cooler and other units which require lubrication.

The throttle valve 65 is provided with a spool 651 backed by a spring 652 at one end, said spool 651 moving in linked state with the throttle mechanism depending on the throttle opening $\theta$ of the carburetor 102. When the throttle opening $\theta$ is less than the first setting value $\theta_1$ ($0 \leq \theta < \theta_1$), passages 3 and 9 communicate with an outlet port 654. When the throttle opening $\theta$ is greater than the first setting value $\theta_1$ ($\theta_1 \leq \theta$), the passage 1 communicates with passage 3 leading to the manual valve 62. When the throttle opening $\theta$ is larger than the second setting value $\theta_2$ ($\theta_2 \leq \theta$, $\theta_1 < \theta_2$), the passage 10 communicates with an outlet port 653. When the throttle opening $\theta$ is larger than the third setting value $\theta_3$ ($\theta_3 \leq \theta$, $\theta_2 < \theta_3$), the passage 11 communicates with the exhaust port 653. When $\theta$ is larger than the first setting value $\theta_1$ ($\theta_1 < \theta$), the passage 1 communicates with the passage 9 leading to the second torque ratio pressure output mechanism 66b of the torque ratio pressure control valve 66. Table 2 shows the relation between the throttle opening $\theta$ and the oil supply state in the passages 3, 9, 10 and 11.

TABLE 2

| $\theta$ | $0 \leq \theta < \theta_1$ | $\theta_1 \leq \theta < \theta_2$ | $\theta_2 \leq \theta < \theta_3$ | $\theta_3 \leq \theta \leq 100\%$ |
|---|---|---|---|---|
| 3 | X | O | O | O |
| 9 | X | O | O | O |
| 10 | — | — | X | X |
| 11 | — | — | — | X |

In the above table, a symbol (O) designates communication of pressure from passage 1, a dash (–) symbol designates no communication of pressure to passages 10 and 11, and a symbol (X) designates exhaust of hydraulic pressure.

Figure 3:
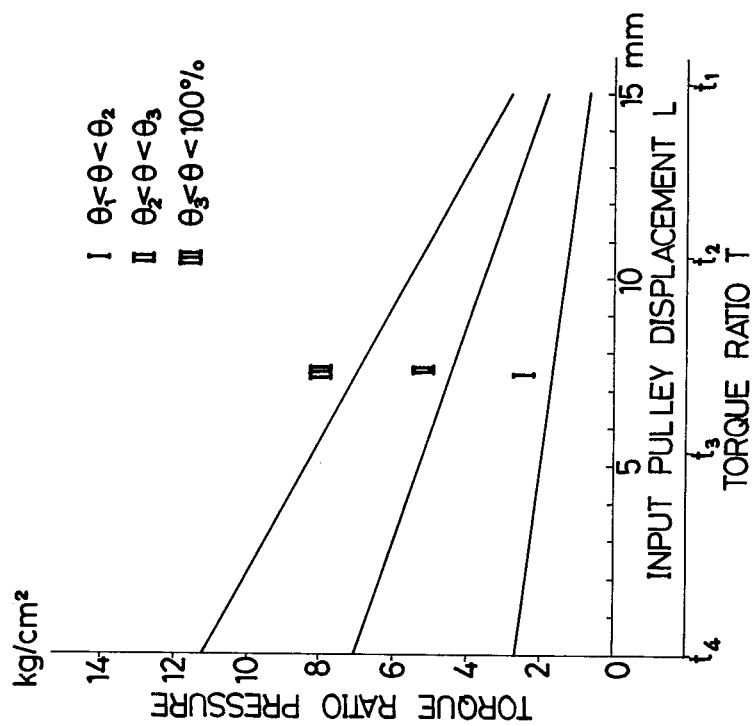
FIG. 3 is a graph showing output characteristic of a torque ratio pressure control valve.

The torque ratio pressure control valve 66 is provided with a spool 662 linked to the movable flange 322 of the output pulley 32 of the V-belt type continuously variable transmission and constituting the second torque ratio pressure output mechanism 66b, and a spool 661 disposed in series with the spool 662 through a spring 663 and constituting the first torque ratio pressure output mechanism 66a. The first torque ratio pressure output mechanism 66a is provided with a port 664 to which the line pressure is supplied directly or through the throttle valve, the passage 3, the manual valve 62 and the passage 6, and an output port 665 leading to the output passage 8 to the regulator valve 61. The spool 661 has lands 661a, 661b, 661c with the diameter decreasing in order. The lands 661a, 661b, 661c receive feedback of output hydraulic pressure from passages 10, 11, 13 through orifices 666, 667, 668, respectively. Pressure in the feedback passages 10 and 11 is reduced in sequence through the throttle valve 65 as above described. Thereby the first torque ratio pressure decreases gradually corresponding to decrease of the reduction ratio T, and increases stepwise corresponding to the increase of the throttle opening as shown in FIG. 3. The second torque ratio pressure output mechanism 66b receives the throttle pressure (equivalent to the line pressure in this embodiment) supplied from the passage 9 when the throttle opening is in the range $\theta_1 \leq \theta$ and provides the second torque ratio pressure to the regulator valve 61 through the passage 7 when the reduction ratio T is in the range $T_3 \leq T$ as shown in lower portion of FIG. 2.

Figure 7:
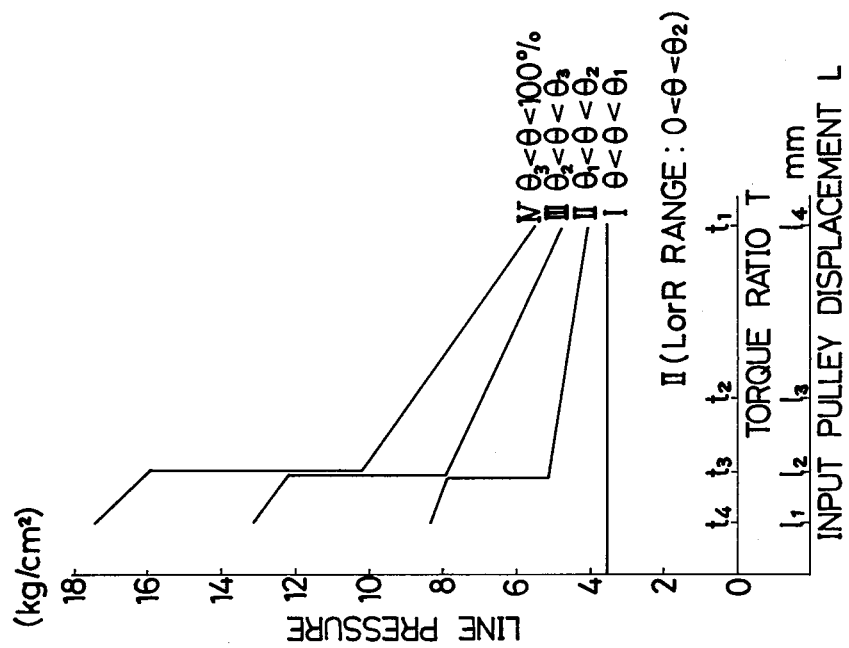
FIG. 7 is a graph showing output line pressure as a characteristic of the hydraulic pressure regulator according to the present invention for various throttle openings $\theta$.
Figure 8:
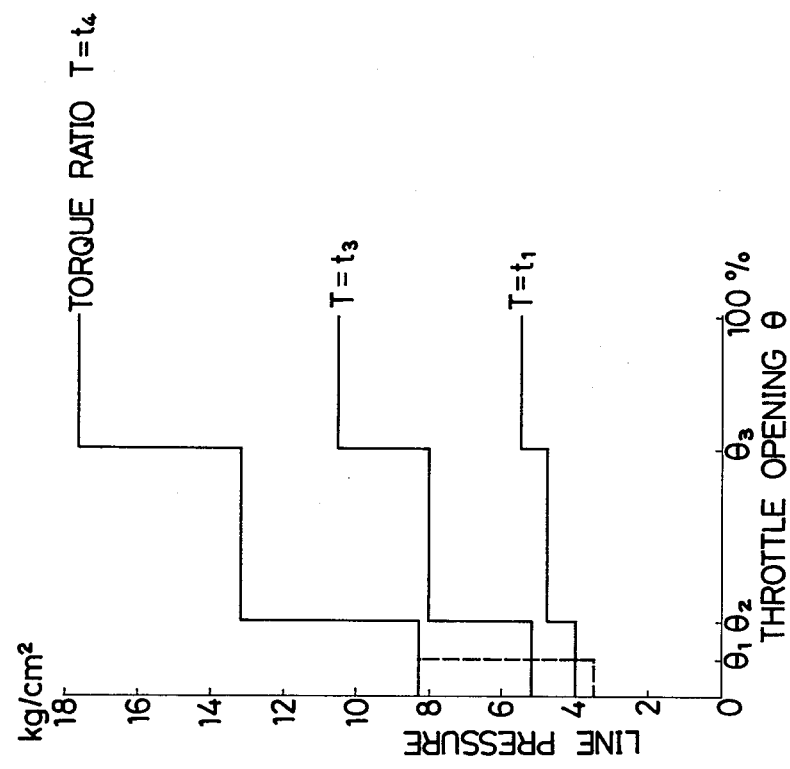
FIGS. 8–9 are graphs showing line pressure as a characteristic of the hydraulic pressure regulator according to the present invention for various reduction ratios T.
Figure 9:
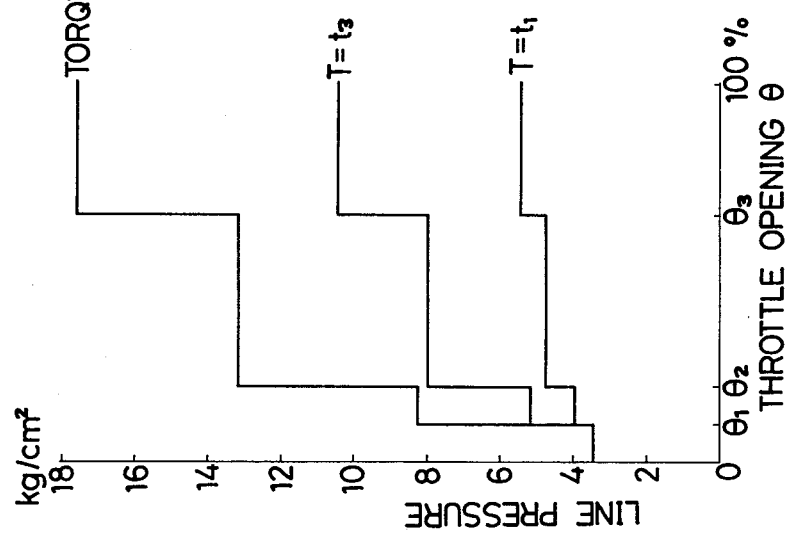

The regulator valve 61 receives the above mentioned first and second torque ratio pressure at two ports 619 and 618 having different diameters in the regulator plunger, thereby the valve 61 provides the line pressure as shown in FIGS. 7–9.

Figure 4:
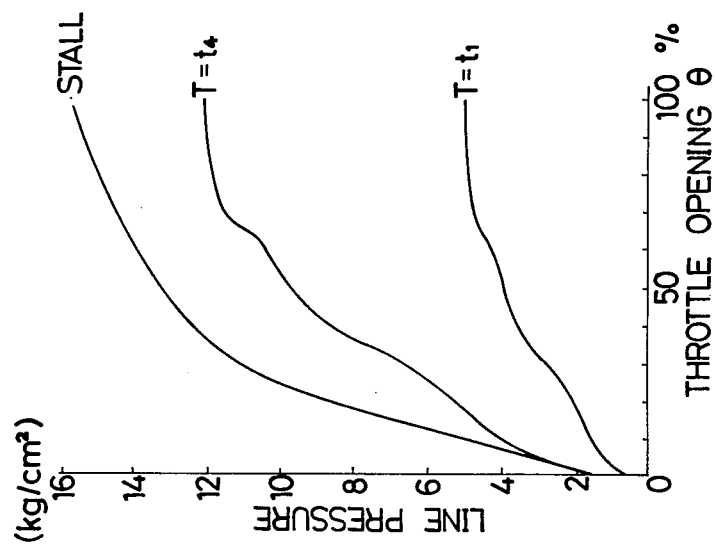
FIG. 4 is a graph showing required line pressure as a characteristic of the hydraulic control circuit for various reduction ratios.
Figure 6:
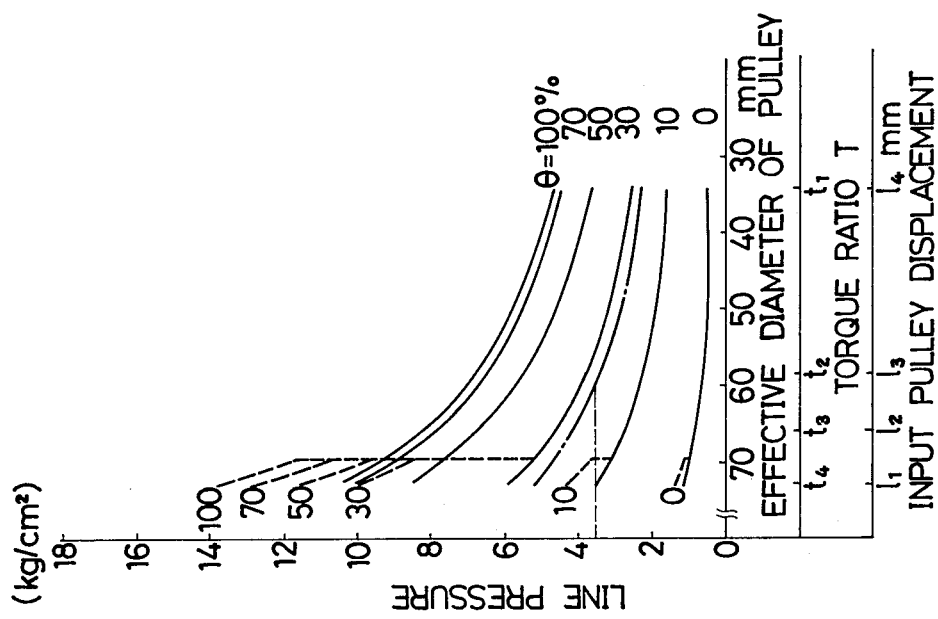
FIG. 6 is a graph showing required line pressure as a characteristic of the hydraulic control circuit for various throttle openings.

FIGS. 4 and 6 show the minimum values necessary for the line pressure.

Referring to FIG. 2, the shift control mechanism 70 comprises a shift control valve 71 having a spring 711 at one end and a spool 712 receiving the line pressure from an oil chamber 713 at the other end, an orifice 72 disposed in the passage 1 supplying the line pressure to the oil chamber 713, a pressure limiting valve 73 mounted between the orifice 72 and the oil chamber 713, and a solenoid valve controlled by an electric control circuit as hereinafter described and regulating the hydraulic pressure within the oil chamber 713.

When the solenoid valve 74 is operated to open a drain port 741 and pressure in the oil chamber 713 is exhausted, the spool 712 of the shift control valve 71 is moved to the left in the figure under the action of the spring 711. Thereby the passage 14, leading to the hydraulic servo system 49 acting on the multi-plate clutch 45 of the planetary gear set 49, and the passage 15, leading to the hydraulic servo system 48 acting on the multi-plate brake 42, communicate respectively with the drain ports 714 and 715 and the pressure thereof is exhausted so as to release the multi-plate clutch 45 or the multi-plate brake 42. When the solenoid valve 74 is not operated, and drain port 741 is closed and the spool 712 is positioned at the right in the figure under the line pressure supplied to the oil chamber 713. Thereby the passages 4 and 5 communicate respectively with the passages 14 and 15 for engagement of the multi-plate clutch 45. In this embodiment, the shift control valve 71 is provided with oil chambers 717 and 716, to feedback the output hydraulic pressure in the passages 14 and 15, so that a rise in the output pressure is retarded and the multi-plate clutch 45 and the multi-plate brake 42 are prevented from shock upon engagement.

The torque ratio control unit 80 comprises a torque ratio control valve 81, orifices 82 and 83, a downshift solenoid 84, and an upshift solenoid 85. The torque ratio control valve 81 is provided with oil chambers 815 and 816 on both ends to which the line pressure is supplied from the passage 1 through the orifices 82 and 83 respectively, an oil chamber 819 including an input port 817 leading to the passage 1 and varying the opening area according to the amount of displacement of the spool 812, and an output port 818 leading to the hydraulic servo system 313 of the input pulley 31 of the V-belt type continuously variable transmission 30 through the passage 2, a drain port 814 exhausting the oil chamber 819 according to the amount of displacement of the spool 812, and a drain port 813 exhausting the oil chamber 815 according to the amount of displacement of the spool 812. The downshifting solenoid 84 and the upshifting solenoid 85 are connected to the oil chambers 815 and 816 of the torque ratio control valve 81 respectively. Both solenoids 84 and 85 are operated by the output of the electric control circuit as hereinafter described and exhaust the oil chambers 815 and 816 respectively.

Figure 5:
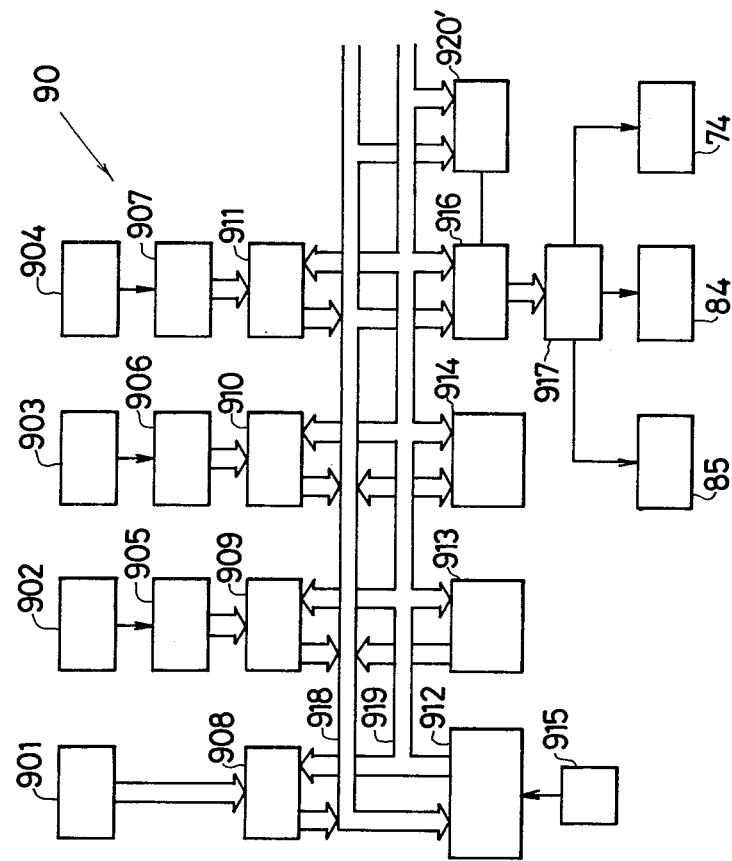
FIG. 5 is a block diagram of an electric control circuit.

FIG. 5 shows the design of the electric control circuit for controlling the solenoid valve 74 of the shift control mechanism 70, the downshift solenoid valve 84 and the upshift solenoid valve 85 of the torque ratio control device 80 in the hydraulic control circuit shown in FIG. 2.

The electric control circuit comprises a shift lever switch 901 detecting the shift lever positions P, R, N, D or L, a revolution speed sensor 902 detecting the revolution speed of the input pulley 31, a vehicle speed sensor 903, a throttle sensor 904 detecting the throttle opening of the carburetor, a speed detecting and processing circuit 905 converting the output of the revolution speed sensor 902 into a voltage signal, a vehicle speed detecting circuit 906 converting the output of the vehicle speed sensor 903 into a voltage signal, a throttle opening detecting and processing circuit 907 converting the output of the throttle sensor 904 into a voltage signal, input interfaces 908-911 for the sensors 901, 902, 903 and 904, a central processing unit (CPU) 912, a read only memory (ROM) 913 storing the control program for the solenoid valves 74, 84, 85 and data required for their control, a random access memory (RAM) 914 temporarily storing the input data and parameters required for control, a clock 915, an output interface 916, and a solenoid output driver 917 converting the output of the output interface 916 into the operating output for the upshift solenoid 85, the downshift solenoid 84 and the shift control solenoid 74. The input interfaces 908-911, the CPU 912, the ROM 913, the RAM 914 and the output interface 916 communicate with each other through a data path 918 and an address pass 919.

The function of the hydraulic regulator 60, comprising in this embodiment the torque ratio pressure control valve 66, the throttle valve 65, the manual valve 62 and the regulator valve 61 will be now described.

Working fluid in the hydraulic control circuit is supplied from the pump 52 driven by the engine. The high line pressure involves large losses in power from the pump 52. In order to drive a vehicle at low fuel cost, the line pressure supplied to the hydraulic control circuit must be at the minimum value needed. In the case of the continuously variable transmission, the line pressure must be sufficient so that the hydraulic servo systems of the input pulley 31 and the output pulley 32 can deliver the torque without slippage of the V-belt 33. Referring to FIG. 6, solid lines show the minimum values necessary for the line pressure corresponding to variation of the reduction ratio T between the input and output shafts for various throttle openings so that the engine is driven at optimum fuel cost. Upon starting, it is preferable to use the line pressure shown in as dashed lines. The dashed lines correspond to a line pressure that is greater than that of the solid lines by approximately 20%, since the engine cannot be driven at optimum fuel cost upon starting. When braking, the line pressure shown as a dash-and-dot line is preferred even when the throttle opening is $\theta = 0$.

In this embodiment, the line pressure is regulated by the hydraulic pressure regulator 60 depending on the shift position L, D, N, R or P of the manual valve and the reduction ratio T between the input and output shafts of the V-belt type continuously variable transmission, as follows:

D POSITION

In the manual valve 62, the passage 4 communicates with the passage 3 and pressure in the passage 5 is exhausted. If the shift control solenoid 74 in the shift control mechanism 70 turns OFF and the line pressure is supplied to the oil chamber 713, the rightward movement of the spool 712 causes the passages 4 and 14 to communicate with each other. Thus, the line pressure supplied to the passage 4 acts on the hydraulic servo system 49 of the forward multi-plate clutch 45 through the passage 14 and the vehicle is ready for forward drive.

(1) The throttle opening $\theta$ is in the range $0 \leq \theta \leq \theta_1$

As shown in Table 2, the line pressure supplied by the passage 1 is not delivered by the throttle valve 65 to the passage 3 or 9. The torque ratio pressure control valve 66 is not supplied with hydraulic pressure from the passage 6 or 9 and does not produce the torque ratio pressure. Thus, the line pressure produced by the regulator valve 61 is constant irrespective of variation of the reduction ratio T or the amount of displacement L of the movable flange of the output pulley as shown in graph I of FIG. 7.

(2) When the throttle opening $\theta$ is in the range $\theta_1 \leq \theta \leq \theta_2$ As shown in Table 2, the throttle valve 65 causes the passage 1 to communicate with the passage 3 and 9 and holds the feedback hydraulic pressure in the passages 10 and 11. Thus, the throttle pressure (equivalent to the line pressure in this embodiment) from the passages 6 and 9 is supplied to the torque ratio pressure control valve 66. The first torque ratio pressure output mechanism 66a receives the feedback action of the passages 13, 11 and 10, and provides the second torque ratio pressure through the passage 7 when the reduction ratio T is larger than the setting value $t_3$. The line pressure from the regulator valve 61 is regulated by the input of the first and second torque ratio pressure as shown in curve II of FIG. 7.

(3) When the throttle opening $\theta$ is in the range $\theta_2 < \theta \leq \theta_3$ As shown in Table 2, pressure of the feedback passage 10 is exhausted in the state $\theta_1 \leq \theta \leq \theta_2$. Thus, level of the first torque ratio pressure rises and the line pressure provided by the regulator valve 61 is as shown in curve III of FIG. 7.

(4) When the throttle opening $\theta$ is in the range $\theta_3 < \theta \leq 100\%$ As shown in Table 2, pressure of the feedback passage 11 is exhausted in the state $\theta_2 < \theta \leq \theta_3$. Thus, level of the first torque ratio pressure further rises and the line pressure provided by the regulator valve 61 rises corresponding to the increase of the first torque ratio pressure as shown in curve IV of FIG. 7.

FIG. 8 is a graph showing variation of the line pressure to the throttle opening when the reduction ratio T is $t_1$, $t_3$ and $t_4$.

L POSITION

In the manual valve 62, the passage 1 communicates with the passages 4 and 6, and pressure of the passage 5 is exhausted.

Since the passage 6 is supplied with the line pressure directly from the passage 1 without passing through the throttle valve 65, the first torque ratio pressure is as shown in curve I of FIG. 3 when the throttle opening $\theta$ is in the range $\theta_1 \leq \theta \leq \theta_2$ and the line pressure in the regulator valve 61 receiving the first torque ratio pressure is as shown in curve II of FIG. 7 when $\theta_1 < \theta \leq \theta_2$. When the throttle opening $\theta$ is in the range $\theta_2 \leq \theta$ the state is similar to that in D position and variation of the line pressure to the throttle opening $\theta$ for various torque ratio T ($t_1$, $t_2$, $t_3$) is as shown in FIG. 9.

R POSITION

As shown in Table 1, the passages 5 and 6 communicate with the passage 1 in the manual valve 62, and the passage 4 is exhausted. If the shift control solenoid 74 in the shift control mechanism 70 turns OFF and the line pressure is supplied to the oil chamber 713, the rightward movement of the spool 712 causes the passages 5 and 15 to communicate with each other. The line pressure supplied to the passage 5 is supplied through the passage 15 to the hydraulic servo system 48 of the reverse multi-plate brake 42, and the vehicle is thereby ready for reverse drive. The line pressure is introduced to the passage 6 and functions in the same way as in the L position. In the R position, the torque ratio T in the V-belt type continuously variable transmission 30 is set at the maximum torque ratio $T = t_4$. Therefore, a high reduction ratio need not be achieved in the planetary gear set 40. In this embodiment, control of the line pressure, as in the case of the L position is possible even when the torque ratio T is varied in the R position.

P POSITION AND N POSITION

As shown in Table 1, the passages 4 and 5 are exhausted, and the passage 6 communicates with the passage 3 in the manual valve 62. Since the passage 5 is exhausted, the line pressure provided by the regulator valve 61 is the same as that in the D position. When the manual valve 62 is shifted to D, N or P position, the line pressure in the torque ratio range of $t_3 < T \leq t_4$ is set to lower values at the throttle openings less than $\theta_1\%$. If the line pressure were set to higher levels during running, maintaining the line pressure would become difficult since much oil leakage occurs at various portions in the hydraulic circuit at high oil temperature. Moreover, a decrease in the amount of oil supplied to the oil cooler would further raise the oil temperature and could cause problems.

When the manual valve 62 is shifted to L or R position, the line pressure in the range of $t_3 \leq T \leq t_4$ is set to higher values at the throttle openings less than $\theta_1\%$. Since relatively high hydraulic pressure is required during engine braking even at the low throttle openings. The hydraulic pressure required in this condition is shown in the dash-and-dot line of FIG. 6. Referring to FIG. 7, if the line pressure is close to the required value shown in FIG. 6, the power loss in the pump 52 is reduced and efficiency is improved in fuel cost and rate of fuel dissipation.

The operation of the electric control circuit 90, the shift control mechanism 70 controlled by the circuit 90 and the torque ratio control device 80 of the present invention will now be described by referring to the program flowcharts shown in FIGS. 16-23.

In this embodiment, revolution speed N' of the input pulley is controlled by the electric control circuit 90 so that fuel cost is optimized in all degrees of the throttle opening.

Figure 10:
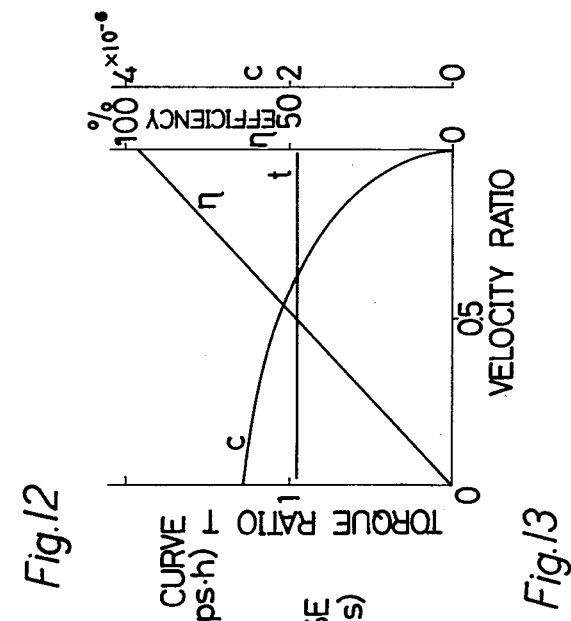
FIG. 10 is a graph showing an optimum-fuel-consumption power curve for an example.
Figure 11:
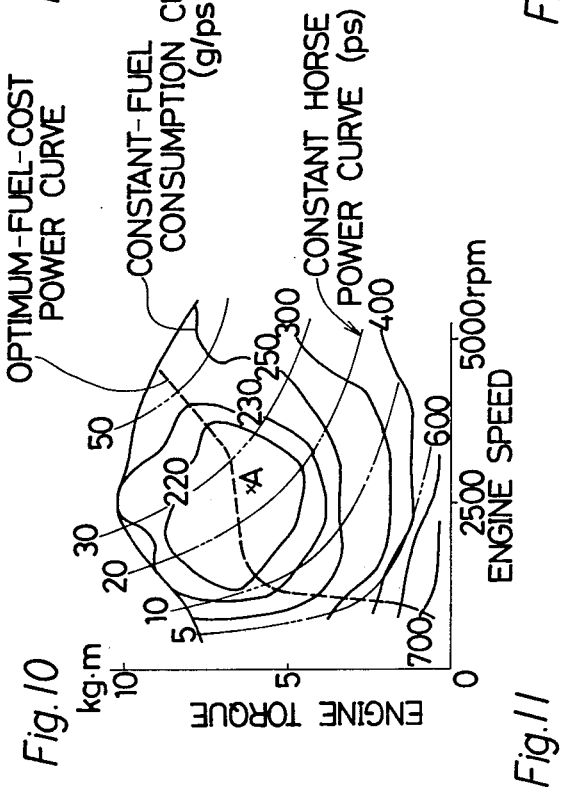
FIG. 11 is a graph showing characteristic of engine output.

In general, a vehicle engine is driven according to the optimum-fuel-cost power curve shown as a dashed line in FIG. 10. In FIG. 11, the abscissa represents the engine revolution speed (rpm) and the ordinate represents the output shaft torque (Kg·m). The rate of fuel consumption Q (gram/Pferde starke·hour) and the power P (Pferde starke) at any point A are given by the constant fuel consumption curve in solid line and the constant horsepower curve in dash-and-dot line respectively. The fuel consumption per hour at the point A is given by:

$$S = Q \times P \ (g/h)$$

Figure 12:
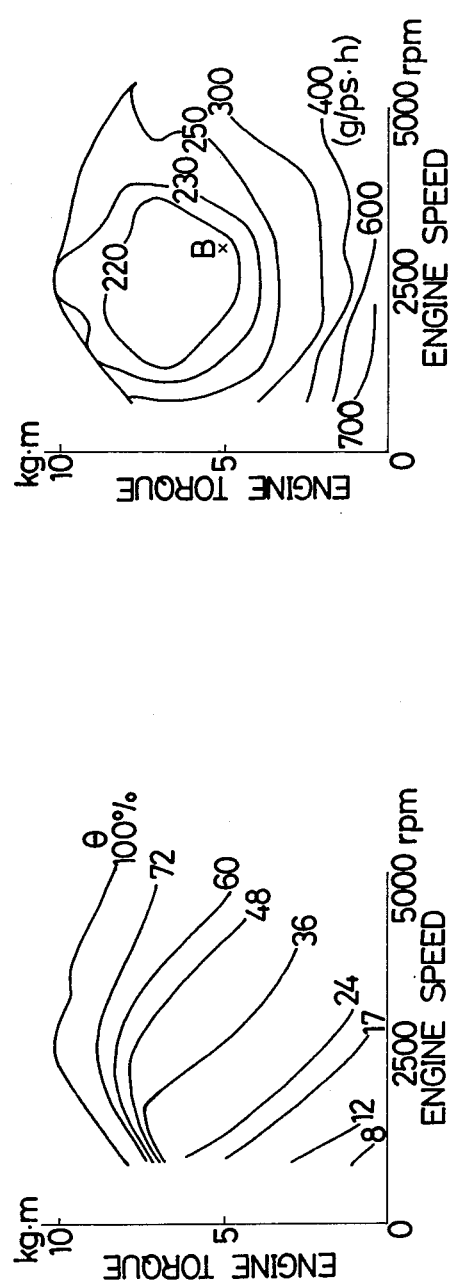
FIG. 12 is a graph showing the performance curve of a fluid delivering mechanism.
Figure 13:
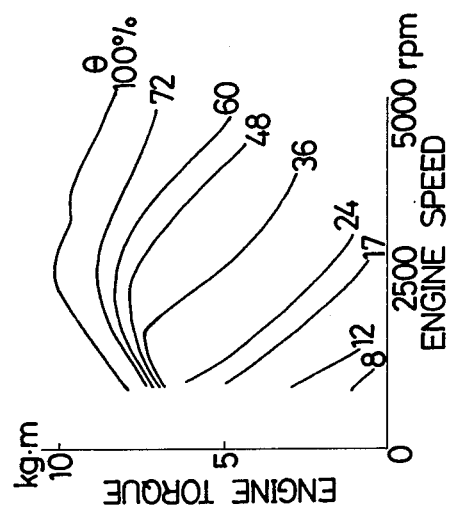
FIG. 13 is a graph showing constant fuel consumption curves.
Figure 14:
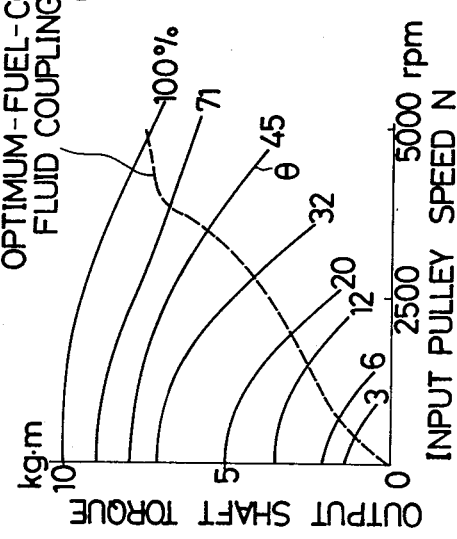
FIG. 14 is a graph showing the optimum-fuel-consumption fluid coupling output curve.
Figure 15:
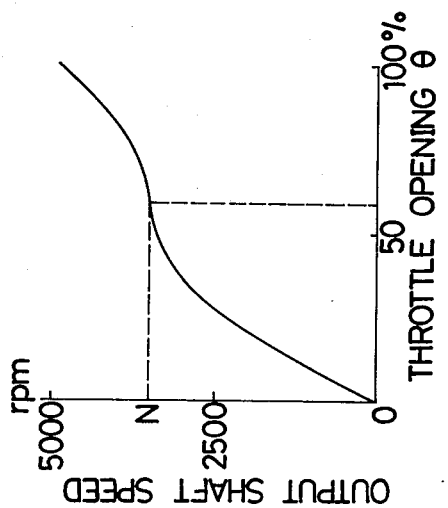
FIG. 15 is a graph showing the optimum-fuel-consumption fluid coupling as a characteristic of output revolution speed.

The fuel consumption amount S per hour is calculated for each point along constant horsepower curves to determine the point with minimum value of S in each constant horsepower curve. By connecting the points with minimum S on each constant horsepower curve, the optimum-fuel-cost power curve is obtained which shows the engine driving condition with optimum fuel consumption for every horsepower. In this embodiment where the engine 100 is associated with the fluid coupling 21, the fluid coupling output curve with optimum fuel cost shown in FIG. 14 is obtained in a manner similar to the above described procedure from the engine output characteristic curve with respect to the throttle opening shown in FIG. 11, from the fluid coupling characteristic curve shown in FIG. 12 and from the constant fuel consumption rate of engine in FIG. 13. FIG. 15 shows the correlation between the throttle opening and the fluid coupling output revolution speed obtained from the fluid coupling output curve with optimum fuel cost in FIG. 14. The fluid coupling output revolution speed in this figure is used as the input pulley revolution speed in this embodiment.

In the continuously variable transmission of this embodiment, the reduction ratio between the input pulley 31 and the output pulley 32 is determined by the input pulley revolution speed with optimum fuel cost given by the above procedure and the actual input pulley revolution speed following reduction.

Figure 17:
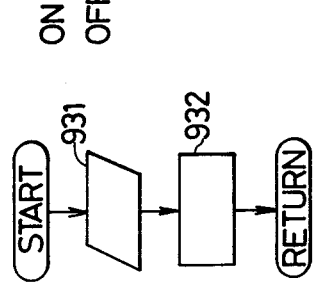
Figure 19:
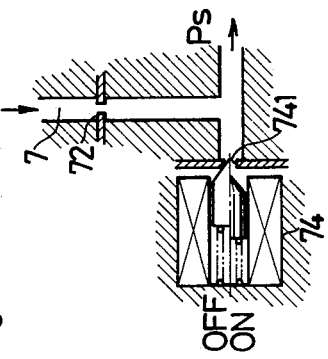
FIG. 19 is a partly enlarged view of a shift control mechanism.

The torque ratio control device 80 is controlled by comparing the input pulley revolution speed with optimum fuel cost given in FIG. 17 with the actual input pulley revolution speed and regulating the reduction ratio between the input and output pulleys using both solenoid valves 84 and 85 in the control device 80, so that the actual revolution speed coincides with the revolution speed for optimum fuel cost.

Figure 16:
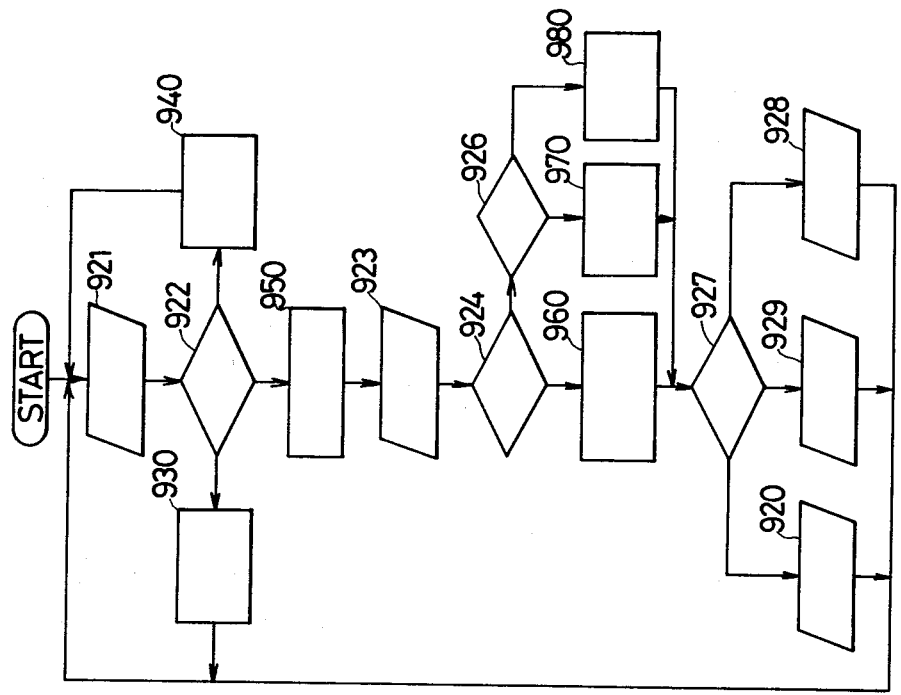
FIGS. 16, 17, 20, 21, 22, and 23 are program flowcharts illustrating operation of an electric control circuit.
Figure 18:
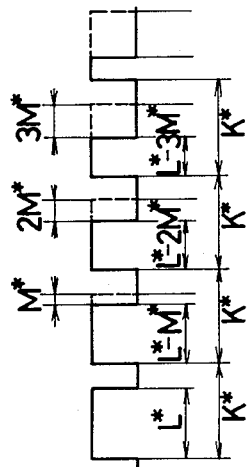
FIG. 18 is a wave form chart illustrating duty control.
Figure 21:
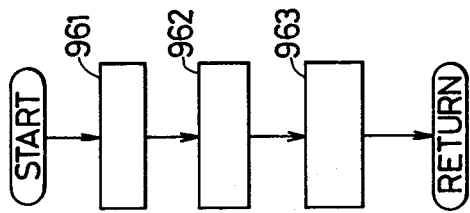

FIG. 16 shows a flowchart of the entire control system for the input pulley revolution speed. The throttle sensor 904 reads out the throttle opening $\theta$ at unit 921, and the shift lever switch 901 determines the shift lever position at unit 922. When the shift lever is verified to be in P or N position, subroutine 930 for processing the P or N position shown in FIG. 17 acts. The subroutine 930 turns OFF both solenoid valves 84 and 85 at unit 931 and the RAM stores the state of the shift lever in P or N position at unit 932. The input pulley 31 is thereby in a neutral state. When the shift lever is changed from P or N position to R position, or N position is changed to D position, shock control processing is carried out at units 940 in order to retard the shock involved in P, N-R shift and N-D shift respectively. The shock control processing is effected by applying and decreasing gradually a pulse train as shown in FIG. 18, a pulse width in each period K* being represented by L*−nM* (n=1, 2, 3, ... .) to the shift control solenoid valve 74 of the shift control mechanism 70 shown in FIG. 19 (hereinafter referred to as "duty control"). When the shift control solenoid 74 is subjected to duty control as above described, the oil chamber 713 of the shift control valve 71 is supplied with hydraulic pressure Ps regulated in accordance with the duty control.

The shift control mechanism 70 regulates the timing of intake and exhaust of hydraulic pressure to the hydraulic servo systems 48 and 49 of the planetary gear set 40 by operation of the solenoid valve 74 in response to the output of the electric control circuit 90 so as to eliminate shock during the shift. The control mechanism 70 also holds the upper limit of the hydraulic pressure supplied to the hydraulic servo system 48 and 49 below a prescribed value so as to limit the engaging pressure of the clutch and brake.

Referring to FIG. 26, assuming that pressure receiving areas of the lands on a spool 712 of the shift control valve 71 are represented by $S_1$, $S_1$, $S_1$, $S_2$ in sequence from the left, the force of spring 711 is represented by $Fs_1$, and the hydraulic pressure in oil chamber 713 is represented by Ps, the hydraulic servo system 49 of the multi-plate clutch 45 engaged in forward drive and the hydraulic servo system 48 of the multi-plate brake 42 engaged in reverse drive are supplied respectively with hydraulic pressure Pc and Pb calculated from the hydraulic balance equations (1) and (2) as follows:

$$\text{Forward: } Ps \times S_1 = Pc \times S_2 + Fs_1 \quad (1)$$

$$Pc = \frac{S_1}{S_2} \times Ps - \frac{Fs_1}{S_2}$$

$$\text{Reverse: } Ps \times S_1 = Pb \times (S_1 - S_2) + Fs_1 \quad (2)$$

$$Pb = \frac{S_1}{S_1 - S_2} \times Ps - \frac{Fs_1}{S_1 - S_2}$$

Assuming that the pressure receiving area of the valve body 731 inserted in the pressure limiting valve 73 is represented by $S_3$, and the force of a spring 732 behind the valve body 731 is represented by $Fs_2$, the pressure limiting valve 73 is operated by P limit, the maximum value of Ps, calculated from the hydraulic balance equation (3) as follows:

$$P \text{ limit} \times S_3 = Fs_2 \quad (3)$$

$$P \text{ limit} = \frac{Fs_2}{S_3}$$

Pc and Pb are restricted to the maximum values Pc limit and Pb limit respectively according to equations (4) and (5) as follows:

$$\text{Forward: } Pc \text{ limit} = \frac{S_1}{S_2} \times P \text{ limit} - \frac{Fs_1}{S_2} \quad (4)$$

$$\text{Reverse: } Pb \text{ limit} = \frac{S_1}{S_1 - S_2} \times P \text{ limit} - \frac{Fs_1}{S_1 - S_2} \quad (5)$$

Figure 20:
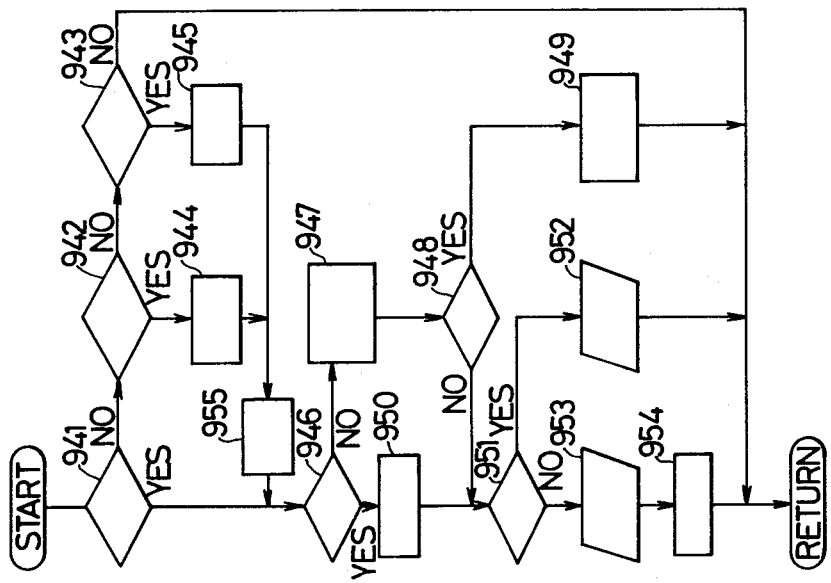

FIG. 20 shows a program flowchart in the case of duty control by parameters K*, L*, M* shown in the wave form chart of FIG. 18. The decision whether shock control is processed or not is determined at unit 941. If the shock control is to be processed, the processing continues. If not processed, any change in the shift lever switch 901 is determined at units 942 and 943. A change from P or N position to R position is determined at 942; a change from N position to D position is determined at 943. If a change is detected, corresponding parameters K*, L*, M* are set at unit 944 or 945, and FLUG designating the ready state for shock control processing is set to ON at unit 955. If no change is detected, process is returned and the shift shock control is not effected. Parameter K verifying the end of one period K* of the shock control processing is determined at unit 946. If the value of K is not positive, K is set to K*, L* to L*−M*, and L to L* at unit 947. Whether L≦0 or not is determined at unit 948. If L≦0, FLUG is set to OFF at unit 949. The state that L≦0 and FLUG set to OFF means the end of shock control processing. If parameter K verifying the end of one period K* is determined positive at unit 946, K-1 is set to K at unit 950. When K is set at unit 950 and L≦0 is determined "ON" at unit 948, parameter L verifying the end of ON time duration in one period K is determined at unit 951. If L=0, the solenoid valve 76 generates an OFF command at unit 952. If L is not zero, the solenoid valve 74 generates an ON command at unit 953 and L-1 is set to L at unit 954 thereby process is returned. Similar shock control may be processed using the programmable timer 920' shown in FIG. 5.

Referring to FIG. 16, following the N-D shock control processing at unit 950, the input pulley revolution speed sensor 902 detects the actual input pulley revolution speed N' at unit 923. Whether the throttle opening θ is zero or not is determined at unit 924. If θ≠0, data for the input pulley revolution speed N* at optimum fuel cost corresponding to the throttle opening θ in FIG. 15, having previously been stored in the ROM 913, is then set at unit 960. Referring to the subroutine shown in FIG. 21, the store address of data for N* is set at unit 961, and data for N* is read out from the set address at unit 962, and then the data storing RAM 914 temporarily stores the read data of N* at unit 963.

The actual input pulley revolution speed N' is compared with the optimum-fuel-cost input pulley revolution speed N* at unit 927. If N<N*, the operating command for the downshift solenoid valve 84 is generated at unit 928; if N'>N*, the operating command for the upshift solenoid valve 85 is generated at 929; and if N'=N*, an OFF command for both solenoid valves 84 and 85 is generated at 920.

When θ=0, that is, the throttle is fully closed, the decision of whether the shift lever is set to D position or L position is made at unit 926 in order to determine the necessity for engine braking operation. If necessary, the engine brake control is effected at unit 970 or 980.

Figure 22:
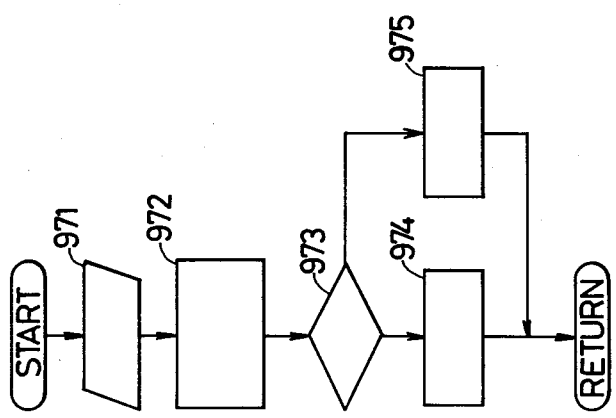
Figure 24:
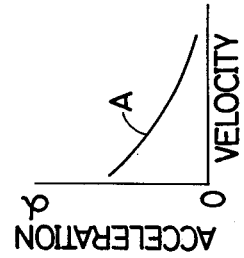
FIG. 24 is a graph showing prescribed acceleration as a function of velocity.

Referring to FIG. 22 showing a program for engine brake control of D position effected at unit 970, the vehicle speed sensor 903 detects the vehicle speed V at unit 971 and the acceleration α is calculated at unit 972. Whether the acceleration α is equal to the acceleration A adapted for the vehicle speed is determined at unit 973. If α>A, N* is set to a value larger than that of N' so as to effect DOWN-SHIFT control at unit 974 and then process is returned. If α≦A, the optimum-fuel-cost input pulley revolution speed N* corresponding to the throttle opening θ is set at unit 975 and then process is returned. The relation between the vehicle speed and the adapted acceleration A is determined or calculation for different vehicles and is illustrated in FIG. 24.

Figure 23:
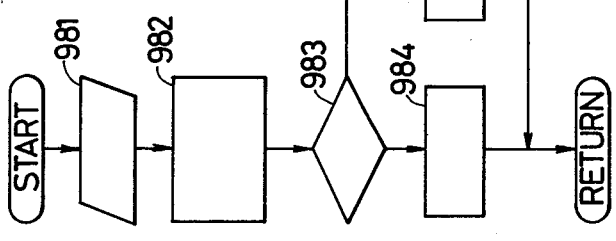
Figure 25:
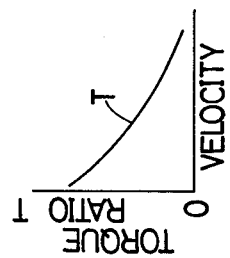
FIG. 25 is a graph showing prescribed torque as a function of velocity.

Referring to FIG. 23 showing the engine brake control of the L position effected at unit 980, the vehicle speed V is detected at unit 981 and then the torque ratio T is calculated from the vehicle speed V and the input pulley revolution speed N according to the following equation at unit 982.

$$T = N/V \times k,$$

wherein k is a constant defined by the reduction ratio of the gear mechanism 23 within the transmission, the final reduction ratio of the vehicle, the radius of the tires and the like. The decision of whether the torque ratio is larger than the torque ratio T* adapted for secure and proper engine braking corresponding to vehicle speed V is effected at unit 983. If T<T*, N* is set to a value larger than that of N' at unit 984 so as to effect DOWN-SHIFT control and then process is returned. If T≧T*, N* is set to a value equal to that of N' and then process is returned. The torque ratio T* adapted for secure and proper engine brake corresponding to the vehicle speed is determined by experiment or calculation for different vahicles and is illustrated in FIG. 25.

In order to retard the shock involved in engagement during N-D shift or N-R shift, fluid pressure Pb or Pc supplied to the hydraulic servo system 48 or 49 is controlled in accordance with the fluid pressure characteristic curve shown in FIG. 27, so that the engagement of the multi-plate clutch 45 or the multi-plate brake 42 is completed in the time interval between A and C in the figure. FIG. 28 shows the relation between the duty (%) of the solenoid valve 74 to control fluid pressure supplied to the hydraulic servo system 48 or 49 and the solenoid pressure Ps produced in the oil chamber 713 by working the solenoid valve 74. The duty (%) is given by following equation:

$$\text{duty (\%)} = \frac{\text{solenoid ON duration in one period}}{\text{solenoid working period}} \times 100\%$$

The solenoid pressure Ps in FIG. 26 is amplified by the shift control valve 71, thereby providing the fluid pressure Pb or Pc supplied to the hydraulic servo system 48 or 49 shown in FIG. 29.

Operation of the torque ratio control unit 80 according to the present inventions will now be described by referring to FIG. 30.

CONSTANT SPEED DRIVE

The solenoid valves 84 and 85 which are controlled by the electric control circuit 90 are turned OFF as shown in FIG. 30A and the spool 812 assumes an intermediate position. The fluid pressure $P_1$ in the oil chamber 816 becomes the line pressure, and, if the spool 812 is to the right in the figure, the fluid pressure $P_2$ in the oil chamber 815 also becomes the line pressure, However, the spool 812 is urged to the left by pushing force $P_3$ of the spring 811. When the spool 812 is moved to the left and the oil chamber 815 communicates with the drain port 813, $P_2$ is exhausted and the spool 812 is urged to the right by fluid pressure $P_1$ in the oil chamber 816. If the spool 812 is moved to the right, the drain port 813 is closed. If a flat surface 812b with a beveled edge is arranged at the land edge between the drain port 813 and the spool 812 as shown in FIG. 30, the spool 812 can be stabilized at the intermediate balance point as shown in FIG. 30A. Since the passage 2 then is closed, fluid pressure in the hydraulic servo system 313 of the input pulley 31 is pushed by the line pressure in the hydraulic servo system 323 of the output pulley 32 through the V-belt 33, thereby fluid pressure in the hydraulic servo systems 313 and 323 is balanced. In reality, however, oil leakage exists at the passage 2 and the input pulley 31 gradually expands and increases the reduction ratio T. In order to compensate for the oil leakage at the passage 2, the drain port 814 is closed in the balanced state of the spool 812 as shown in FIG. 30A and a flat surface 812a with a beveled edge is provided at the land edge of the spool 812. Referring to FIG. 32, in place of the surface 812a the passages 1 and 2 may be communicated by a passage 822 having an orifice 821 in order to attain a similar result.

UP-SHIFT

The solenoid valve 85 is turned ON by the electric control circuit 90 as shown in FIG. 30B. The oil chamber 816 is exhausted and the spool 812 moves to the left in the figure. As the spool 812 moves, the oil chamber 815 is also exhausted through the drain port 813. However, the spool 812 is urged to the left end by the spring 811.

Since the line pressure in the passage 1 is supplied to the passage 2 through the port 818, fluid pressure in the hydraulic servo system 313 rises and the input pulley 31 contracts so as to decrease the reduction ratio T. By controlling the ON time duration of the solenoid valve 85 for an appropriate duration of time, the torque ratio is reduced by the required amount and UP-SHIFT is effected.

DOWN-SHIFT

The solenoid valve 84 is turned ON by the electric control circuit 80 as shown in FIG. 30C, thereby exhausting the oil chamber 815. The spool 812 is moved to the right in the figure by the line pressure in the oil chamber 816, and the passage 2 is exhausted through the drain port 814. The input pulley 31 expands so as to increase the reduction ratio T. By controlling the ON time duration of the solenoid valve 84 in this manner, the reduction ratio is increased and DOWN-SHIFT is effected.

The hydraulic servo system 313 of the input (driving) pulley 31 is supplied with the output fluid pressure in the torque ratio control valve 81, while the hydraulic servo system 323 of the output (driven) pulley 32 is supplied with the line pressure. If Pi is the fluid pressure in the input hydraulic servo system 313, and Po is the fluid pressure in the output hydraulic servo system 323, the relation between the pressure ratio Po/Pi and the reduction ratio T is shown in the graph of FIG. 31. For example, assume the state represented by point a (throttle opening θ=50%, reduction ratio T=1.5) is changed to the state where θ=30% by releasing the acceleration. If the pressure ratio Po/Pi is not changed, the working point is transferred to the point b with the reduction ratio T=0.87. On the other hand, if the reduction ratio T=1.5 is not changed, the value of Po/Pi is increased by the torque ratio control mechanism 80 controlling the input pulley and the working point is transmferred to the point c. Thus, any value of the reduction ratio can be set corresponding to the load condition by controlling the value of Po/Pi as required.

Figure 33:
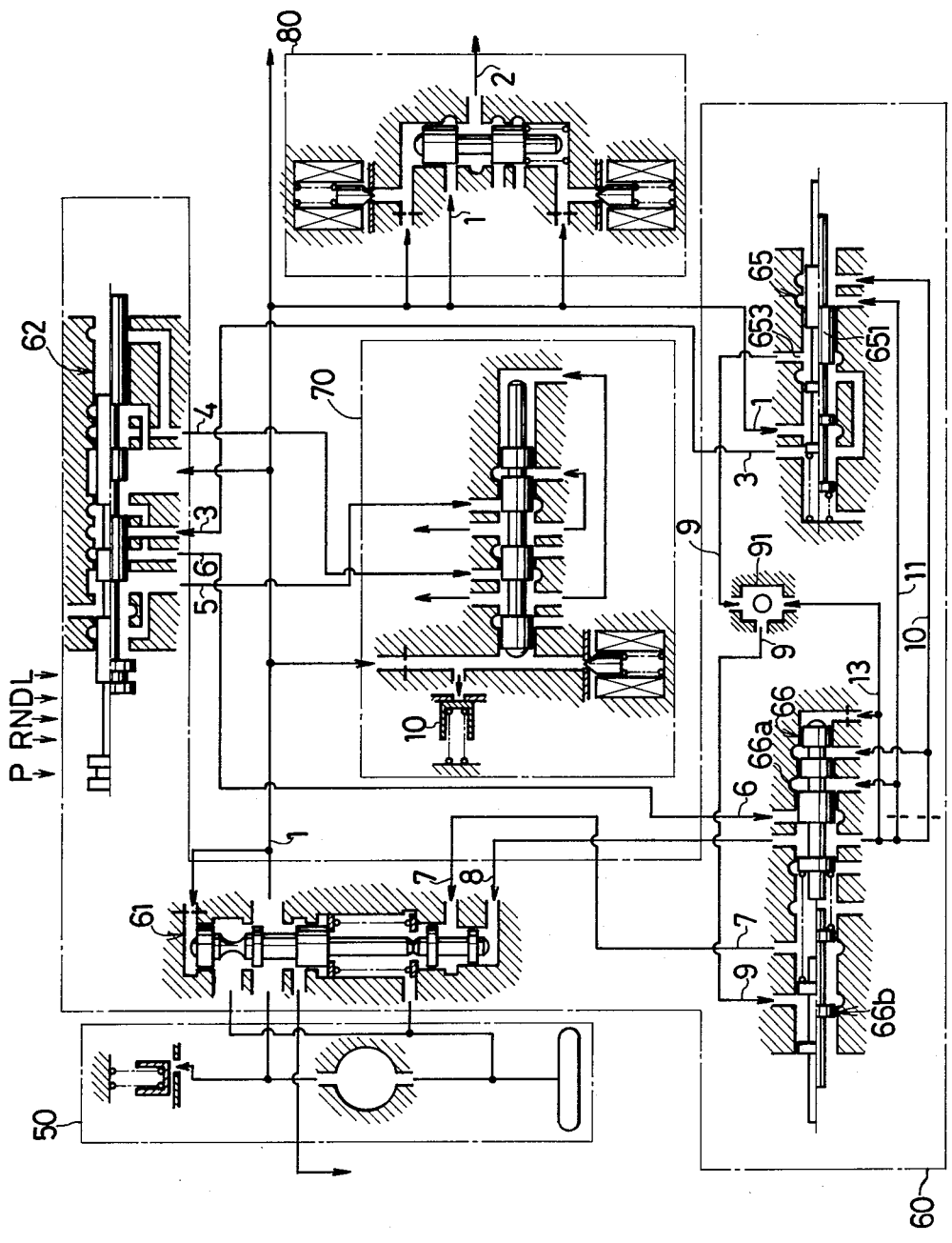
FIG. 33 is a diagram of a hydraulic control circuit of a continuously variable transmission apparatus including a hydraulic pressure regulator as another embodiment of the present invention.

FIG. 33 shows another embodiment of the hydraulic pressure regulator.

In the hydraulic pressure regulator 60 in the above mentioned embodiment, when the throttle opening is large (for example $\theta_3 \leq \theta \leq 100\%$) and the reduction ratio T between the input and output shafts is approximately the maximum value (for example $t_3 \leq T \leq t_4$), the line pressure becomes much higher than the value required by the hydraulic servo system in the V-belt type continuously variable transmission in some running conditions.

Figure 36:
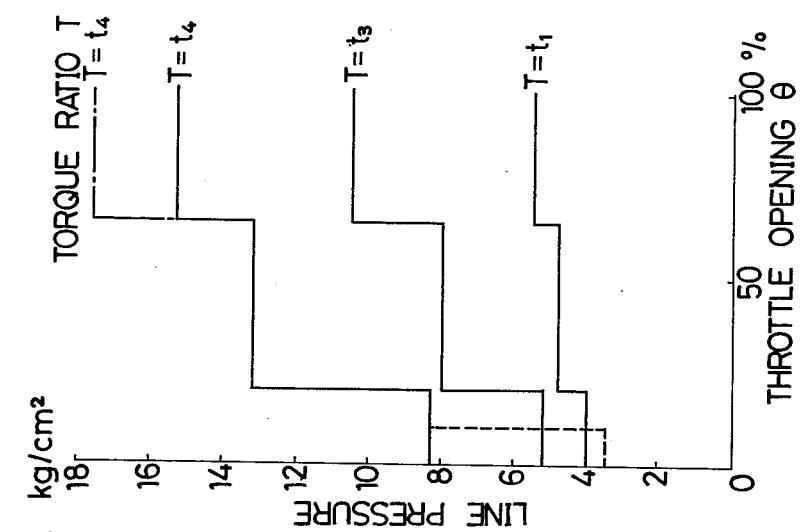
FIGS. 34, 35 and 36 are graphs showing line pressure as a characteristic of the hydraulic pressure regulator in said embodiment.
Figure 35:
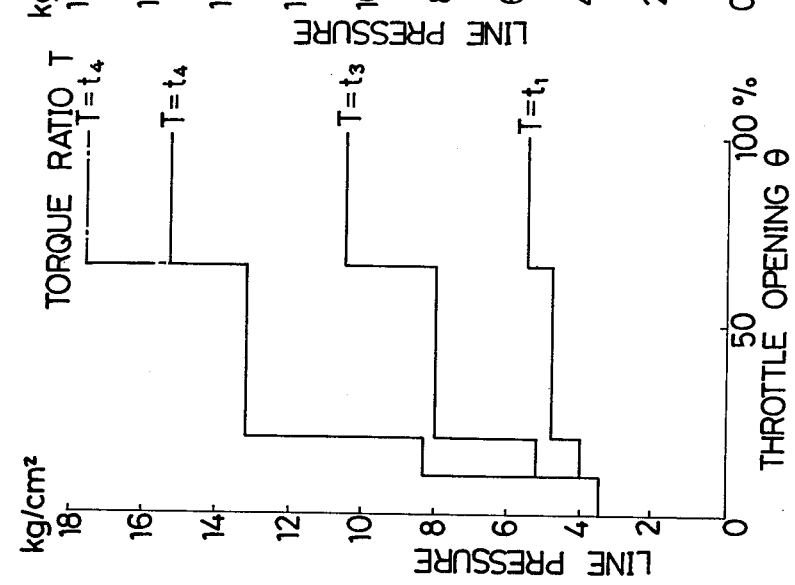
Figure 34:
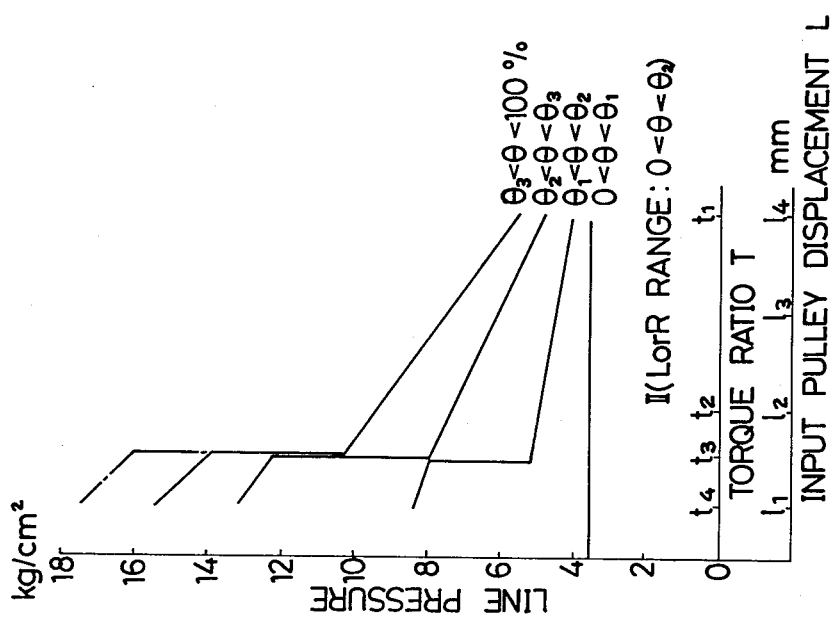

In this embodiment, a three-way check valve 91 is disposed in the passage 9 connecting between the throttle valve 65 and the second throqe ratio pressure output mechanism 66b of the torque ratio pressure control valve 66 and supplied with the first torque ratio pressure from one side (through the passage 13 in this embodiment). When the throttle opening $\theta$ is in the range $\Theta_3 \leq \theta \leq 100\%$, the spool 651 in the throttle valve 65 closes the port 653 leading to the passage 9, thereby the second torque ratio pressure output mechanism 66b is supplied with the torque ratio pressure through the passage 13. Thus, the second torque ratio pressure lower than the throttle pressure (equivalent to the line pressure supplied by the throttle valve 65 when the throttle opening $\theta$ is in the range $\theta_3 \leq \theta \leq 100\%$. At the same time, the second torque ratio pressure supplied to the regulator valve 61 through the passage 7 decrease when the reduction ratio T is in the range $t_3 \leq T \leq t_4$ and the line pressure provided by the regulator valve 61 is as shown in FIG. 33, wherein in comparison to the first embodiment (shown by dash-and-dot line in the figure) the line pressure can be reduced when $\theta_3 \leq \theta \leq 100\%$ and $t_3 \leq T \leq t_4$. When the throttle pressure is supplied from the throttle valve 65 to the passages 9, the throttle pressure is higher than the first torque ratio pressure thereby the torque ratio pressure control valve is supplied with the throttle pressure. Characteristic of the line pressure to the throttle opening for various reduction ratios T is shown in FIG. 35 (the shift lever in the position P, N or D) and FIG. 36 (the shift lever in the position L or R). Dash-and-dot line in the figure shows the line pressure of the first embodiment shown in FIGS. 8 and 9.

As described in the above embodiment, the line pressure can be approached more closely to the minimum value required by supplying the first torque ratio pressure output mechanism of the torque ratio control valve when the throttle opening is large and the reduction ratio is high.

In the present invention, installation of a plurality of feedback passages in the torque ratio pressure control valve 66 enables the first torque ratio pressure to change into required number of steps, thus the line pressure can be approached still more closely to the minimum value required.

We claim:

1. A hydraulic pressure regulator in a V-belt type continuously variable transmission for vehicles having input and output pulleys mounted respectively on an input and an output shaft and having variable effective diameters, and a V-belt drivingly connected to said input and output pulleys, wherein a torque ratio between the input and output shafts is continuously controlled by adjusting said variable effective diameters of each pulley by hydraulic pressure, characterized in that said hydraulic pressure regulator device comprises a hydraulic pressure source,
   a regulator valve means for receiving hydraulic pressure supplied by said hydraulic pressure source and supplying line pressure,
   a torque ratio pressure control valve means dependent on the torque ratio between the input and output shafts,
   a throttle valve means dependent on a throttle opening,
   an exhaust port arranged on said throttle valve means,
   a primary hydraulic passage supplying line pressure to said torque ratio pressure control valve means,
   a secondary hydraulic passage connecting said torque ratio pressure control valve means with said regulator valve means,
   a tertiary hydraulic passage connecting said torque ratio pressure control valve means with said throttle valve means through an orifice,
   wherein said torque ratio pressure control valve causes a torque ratio pressure in said secondary hydraulic passage by controlling the connection between said primary and secondary passages, and
   a feedback fluid passage at least supplying said torque ratio pressure to said torque ratio pressure control valve through an orifice of said tertiary hydraulic passage,
   wherein said hydraulic pressure of said tertiary hydraulic passage is led to said exhaust port dependent on a throttle opening, and said regulator valve means causes stepwise line pressure dependent on a throttle opening by changing said torque ratio pressure.

2. A hydraulic pressure regulator in a V-belt type continuously variable transmission for vehicles in accordance with claim 7, wherein said hydraulic regulator device comprises
   a manual valve means acting with a shift lever,
   a sixth hydraulic passage connecting said manual valve means with said throttle valve means, and
   a seventh hydraulic passage supplying said line pressure to said throttle valve means,
   wherein said primary hydraulic passage is connected to said manual valve means, said sixth hydraulic passage is connected to said primary hydraulic passage when said shift lever is at a particular position, said sixth hydraulic passage is connected to said seventh hydraulic passage when the throttle opening is more than a predetermined valve, the hydraulic pressure in said sixth hydraulic passage is discharged when the throttle opening is less than the predetermined value as a result said line pressure drops, and said regulator valve means causes a line pressure to vary stepwisely depending on a throttle opening and a shift lever position.

3. The hydraulic pressure regulator in a V-belt type continuously variable transmission for vehicles in accordance with claim 1, wherein said hydraulic regulator device comprises
   a fourth hydraulic passage connecting said throttle valve means with said torque ratio pressure control valve,
   a fifth hydraulic passage connecting said torque ratio pressure control valve with said regulator valve means, and a seventh hydraulic passage supplying a line pressure to said throttle valve means, wherein said forth hydraulic passage is connected to said seventh hydraulic passage by said throttle valve means when the throttle opening is more than a predetermined value, said fourth hydraulic passage is connected to said fifth hydraulic passage by said torque ratio pressure control valve when the torque ratio between an input and an output shaft is more than a second predetermined value, and said regulator valve means causes a line pressure to vary stepwisely depending on a throttle opening and a torque ratio.

4. The hydraulic pressure regulator in a V-belt type continuously variable transmission for vehicles in accordance with claim 1, wherein said hydraulic regulator device comprises a fourth hydraulic passage connecting said throttle valve means with said torque ratio pressure control valve, and a fifth hydraulic passage connecting said torque ratio pressure control valve with said regulator valve means, wherein said fourth hydraulic passage is connected to said seventh hydraulic passage by said throttle valve means when the throttle opening is more than said predetermined value said fourth hydraulic passage is connected to said fifth hydraulic passage by said torque ratio pressure control valve when the torque ratio between an input and an output shaft is more than said second predetermined value, and said regulator valve means causes a line pressure to vary stepwisely depending on a shift lever position, a throttle opening and a torque ratio.

5. The hydraulic pressure regulator in a V-belt type continuously variable transmission for vehicles in accordance with claim 2, 3 or 4, wherein at least two feedback fluid passages of the torque ratio pressure are arranged on the torque ratio pressure control valve, said feedback fluid passages leading to said exhaust port in an order depending on the throttle opening, the torque ratio pressure is controlled at least in three stages, resulting in said regulator valve means causing line pressure at least in three stages dependent on the throttle opening.

* * * * *

UNITED STATES PATENT AND TRADEMARK OFFICE
CERTIFICATE OF CORRECTION

PATENT NO. : 4,462,277
DATED : July 31, 1984
INVENTOR(S) : Nobuaki Miki & Shoji Yohoyama It is certified that error appears in the above-identified patent and that said Letters Patent is hereby corrected as shown below:

On the title page the following should be added:

--/73/ Assignee: Aisin-Warner
Kabushiki Kaisha
Anjo, Japan --.

Signed and Sealed this

Eighth Day of January 1985

[SEAL]

Attest:

GERALD J. MOSSINGHOFF

Attesting Officer

Commissioner of Patents and Trademarks